United States Patent [19]

Pajowski et al.

[11] Patent Number: 5,355,090
[45] Date of Patent: Oct. 11, 1994

[54] PHASE CORRECTOR FOR REDUNDANT CLOCK SYSTEMS AND METHOD

[75] Inventors: Raymond W. Pajowski, Oak Forest; Bruce M. Bina, Naperville, both of Ill.

[73] Assignee: Rockwell International Corporation, El Segundo, Calif.

[21] Appl. No.: 124,318

[22] Filed: Oct. 14, 1992

Related U.S. Application Data

[63] Continuation of Ser. No. 730,033, Jul. 12, 1991, abandoned, which is a continuation of Ser. No. 418,301, Oct. 6, 1989, abandoned.

[51] Int. Cl.$^5$ .................... H03K 7/00; H03K 5/159
[52] U.S. Cl. .................... 328/63; 328/72; 328/55; 307/262; 307/269
[58] Field of Search .................... 328/63, 72, 55, 61, 328/155; 307/269, 262; 331/49, 55; 375/108

[56] References Cited

U.S. PATENT DOCUMENTS

| | | | |
|---|---|---|---|
| 3,795,872 | 3/1974 | Napolitano et al. | 331/55 |
| 4,019,143 | 4/1977 | Fallon et al. | 328/71 |
| 4,156,200 | 5/1979 | Gomez | 328/104 |
| 4,185,245 | 1/1980 | Fellinger et al. | 307/219 |
| 4,254,492 | 3/1981 | McDermott, II | 331/49 |
| 4,282,493 | 8/1981 | Moreau | 307/219 |
| 4,598,257 | 7/1986 | Southard | 331/25 |
| 4,651,103 | 3/1987 | Grimes | 331/49 |
| 4,779,008 | 10/1988 | Kessels | 307/269 |
| 4,868,513 | 9/1989 | Piercy et al. | 307/262 |
| 4,882,738 | 11/1989 | Suzuki | 307/269 |

*Primary Examiner*—Timothy P. Callahan
*Assistant Examiner*—Toan Tran
*Attorney, Agent, or Firm*—C. B. Patti; H. F. Hamann

[57] ABSTRACT

A redundant clock system (8) keeps active and standby clock signals in phase with one another through way of a pair of cross-connected phase corrector circuits (PC1 and PC2) each of which operate off one of a pair of frequency locked, asynchonous, master clocks, or a delay compensated signal from a delay connector circuit (103, 104) of the phase corrector (PC1 or PC2). With such a redundant system, a method of switchover is provided in which all clock bus interface circuits are caused to select a standby phase corrector circuit to be active and then causing the previously active phase corrector circuit to operate as the standby to reduce timing errors caused by phase discontinuity.

13 Claims, 4 Drawing Sheets

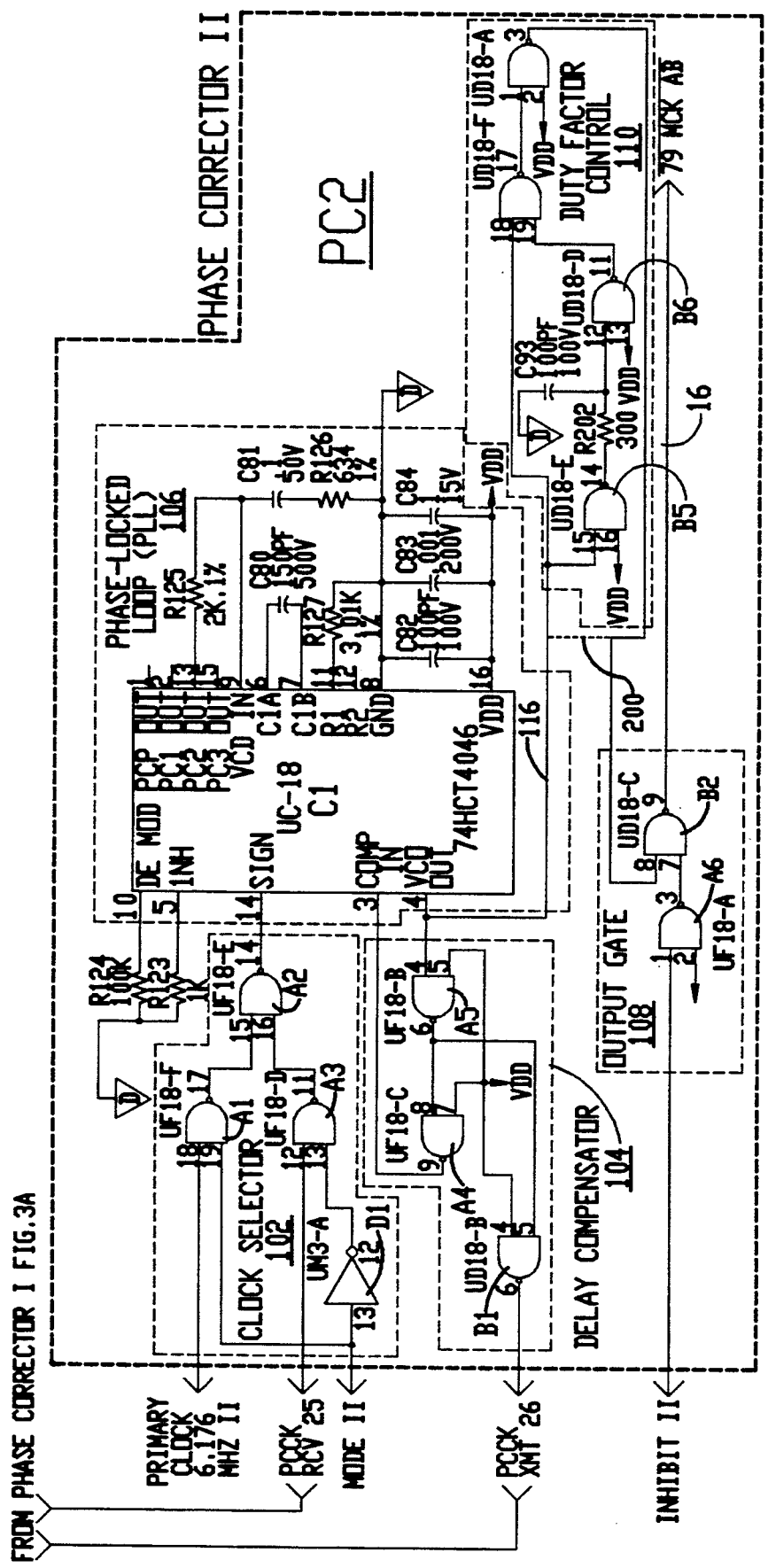

PHASE CORRECTOR FOR REDUNDANT CLOCK SYSTEMS AND METHOD

This application is a continuation of application Ser. No. 07/730,033, filed Jul. 12, 1991 now abandoned, which is a continuation of application Ser. No. 07/418,301, filed Oct. 6, 1989 now abandoned.

BACKGROUND OF THE INVENTION

This invention relates to a redundant clock system.

In synchronous digital multiplex data systems it is common to provide a redundant clock and data bus distribution for reliable operation. The clock busses are referred to as the active and standby busses with the clock signal of the active bus derived from a primary clock reference and the standby clock signal phase locked to that of the active bus clock signal rather than its own associated primary clock reference. During switchover, when the alternate primary clock reference is selected as the source for the active bus phase, discontinuity will occur between the redundant clock busses which can cause system timing errors.

Other important features that may be required of a redundant clock bus distribution plan for some data systems may include active and standby clock precision phase alignment and duty factor correction. Duty factor correction is applied when it is required that the active and standby clocks be maintained at a specific duty factor regardless of the duty factor tolerance of the master/standby clock references.

A redundant clock system for providing bit and frame clock signals is disclosed in U.S. Pat. No. 3,795,972, issued Mar. 5, 1974 to O. Napolitano, G. P. Pasternack and B. R. Saltzberg. In this system the redundant clock outputs called the master and standby are derived from phase locked oscillators which are both phase locked to the same incoming source. The problems and weaknesses of the system of this patent is described in U.S. Pat. No. 4,019,143 issued May 10, 1976, issued to Fallon et al.

A redundant clock system for providing bit and frame clock signals is disclosed in U.S. Pat. No. 4,019,143, issued May 10, 1977 to Fallon et al. Described there is a prior art redundant timing system in which a standby clock output is phase locked to a master clock output. The weakness of this design, is that a phase discontinuity can occur during switchover because of a slow response of the master and standby phase lock loop circuitry while attempting to track a master clock reference that is malfunctioning.

The problem of phase discontinuity which occurs when switching of the clock outputs is due to a master clock malfunction causing the master clock to drift is alleged to be overcome in U.S. Pat. No. 4,019,143 of Fallon et al. However, this design also has problems of its own. The design involves three clock signals at three different frequencies, 2.048 MHZ, 512 KHZ and 8 KHZ. Due to the large amount of combinational and sequential logic used in the design, reliability is reduced and susceptible to noise interference is increased. The phase and duty factor correction precision is not defined, and there is no indication of intended use in redundant timing bus applications when two clock generators are used. The great amount of logic circuitry required by each of the redundant clock generators results in propagation delays of the numerous circuit elements which render precision tracking difficult to achieve. Also, the ability to overcome or minimize phase discontinuity between the two output busses, in order to prevent system timing errors during switchover, may not be possible with this design.

SUMMARY OF THE INVENTION

It is therefore an object of the present invention to provide a redundant clock system which overcomes the aforementioned problems. Preferably, this is achieved by means in which active and standing clock signals are kept in phase with one another through means of a pair of substantially identical phase corrector circuits. Each of the phase corrector circuits selectively operate off one of a pair of frequency locked asynchronous primary clocks or a delay compensated clock output signal of the other phase compensator. In this way, the active and standby clock outputs are kept in phase to reduce timing errors during switchover for diagnostics or maintenance.

It is also an objective to further reduce timing errors caused by phase disconnecting with the above phase corrector by having all clock bus interface circuits to select a standby phase corrector circuit to be active and then causing the previously active phase corrector circuit to operate as a standby.

BRIEF DESCRIPTION OF DRAWINGS

These objects and other objects and advantageous features of this invention will be made apparent from the detailed description of the preferred embodiment of the phase corrector circuit given with reference to the several figures of the drawing, in which.

DETAILED DESCRIPTION

Figure 1:
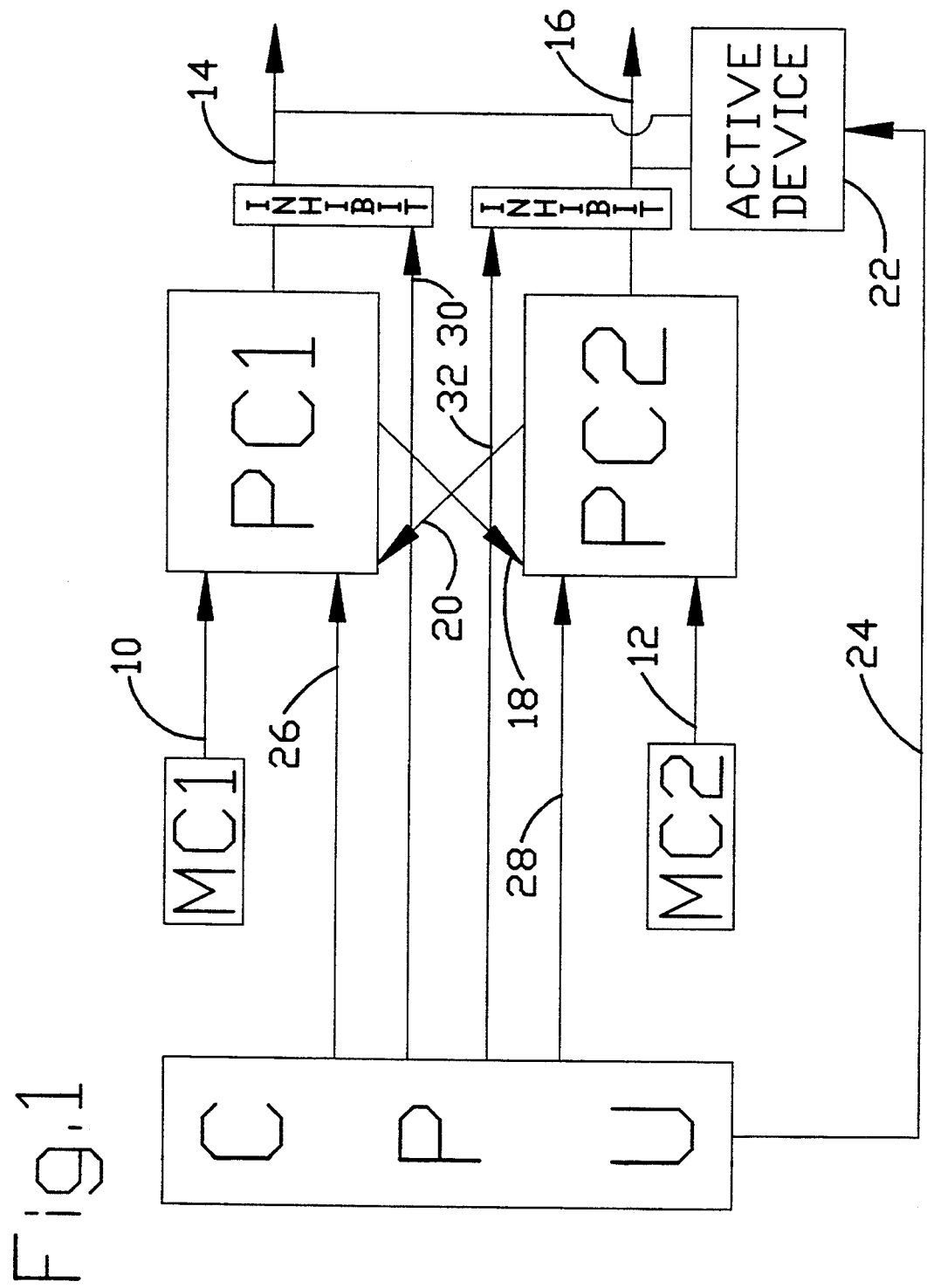
FIG. 1 is a functional block diagram of a clock control system containing a pair of phase corrector circuits of the invention.

Referring to FIG. 1, the clock control system is seen to include a pair of frequency locked, asynchronous master clocks MC1 and MC2 respectively connected to inputs 10 and 12 of two, substantially identical phase corrector circuits PC1 and PC2 which respectively provide synchronous clock signals on outputs 14 and 16. The output 14 of phase corrector PC1 is cross connected through a delay compensator to provide an input signal to another port input 18 of phase corrector PC2. Likewise, the output 16 of phase corrector PC2 is cross connected to provide another signal at input 20 of phase connector PC2. Both these phase correctors have a pair of input points to which input signals are applied, phase corrector PC1 having inputs 10 and 20 and phase corrector having inputs 12 and 18. Each of the outputs 14 and 16 are, of course, also connected to a plurality of active devices 22 such as elements of a PCM telephonic switching network. These are controlled through a connection 24 with a central processing unit CPU which also has outputs connected to mode selection inputs 26 and 28 of the phase correctors PC1 and PC2, respectively.

In the preferred embodiment, redundant phase correctors PC1 and PC2 receive master clock signals at 6.176 MHz from master clocks MC1 and MC2 and from those produce phase and duty factor phase corrected 6.176 MHz clock signals at outputs 14 and 16, respectively. Master clocks MC1 and MC2 are reliable, asynchronous, frequency locked clock sources having unsymmetrical duty factors. The master clock signals are supplied from redundant, proportional-plus-integral phase locked-loop, or PLL, circuits in a typical T1 digital carrier system application, with each PLL circuit receiving the same 1.544 MHZ+/−7 Hz, Stratum 3, T1 input signal. In such case, the output tolerance provided for the master clocks MC1 and MC2 signal is +/−28 Hz. The phase corrector circuits PC1 and PC2 can also be advantageously employed in master timing source applications, where the master clock input signals are supplied by separate, 6.176 MHz+/−28 Hz, oven controlled, crystal oscillators. Clock signals derived and supplied at outputs 14 and 16 are 6.176 MHz+/−28 Hz, 50% duty factor corrected signals that are phase locked to within twenty degrees of each other.

Under normal operation, mode selection inputs 26 and 28 are placed in opposite logic states by the microprocessor CPU to direct the redundant phase corrector circuits PC1 and PC2 for active and standby modes, respectively. In the active mode, a phase corrector PC1, for instance, derives its output signal from its assigned master clock MC1. In the standby mode, the phase corrector PC1 uses the 6.176 MHz clock signal received on its input 20 from the active phase corrector P2 to derive its corresponding output signal. Inhibit signals at inputs 30 and 32 permit the generation of output signals on the outputs 14 and 16 to be disabled during the performance of either a maintenance or diagnostic test routine.

Preferably, the phase corrector circuit of FIG. 1 works in conjunction with a stored program concept in which microprocessor CPU controls the mode selection inputs 26 and 28 exclusively and maintains all external circuits of active devices 22 on the active bus 14 or 16. In accordance with the method of this invention, prior to switchover, where the operating modes of the phase correctors PC1 and PC2 are reversed as a result of either a maintenance or diagnostic test routine, the microprocessor CPU will first cause all external circuits to select the standby bus and then cause the current standby phase corrector PC2 or PC1 to become active. Following this action, the previously active phase corrector PC1 and PC2 becomes the standby unit PC2 or PC1. It has been found this method of controlled operation will prevent the generation of timing errors in a system as a result of the phase discontinuity that occurs between the active and standby redundant busses after switchover as each phase corrector circuit is attempting to track its new reference input.

Figure 2:
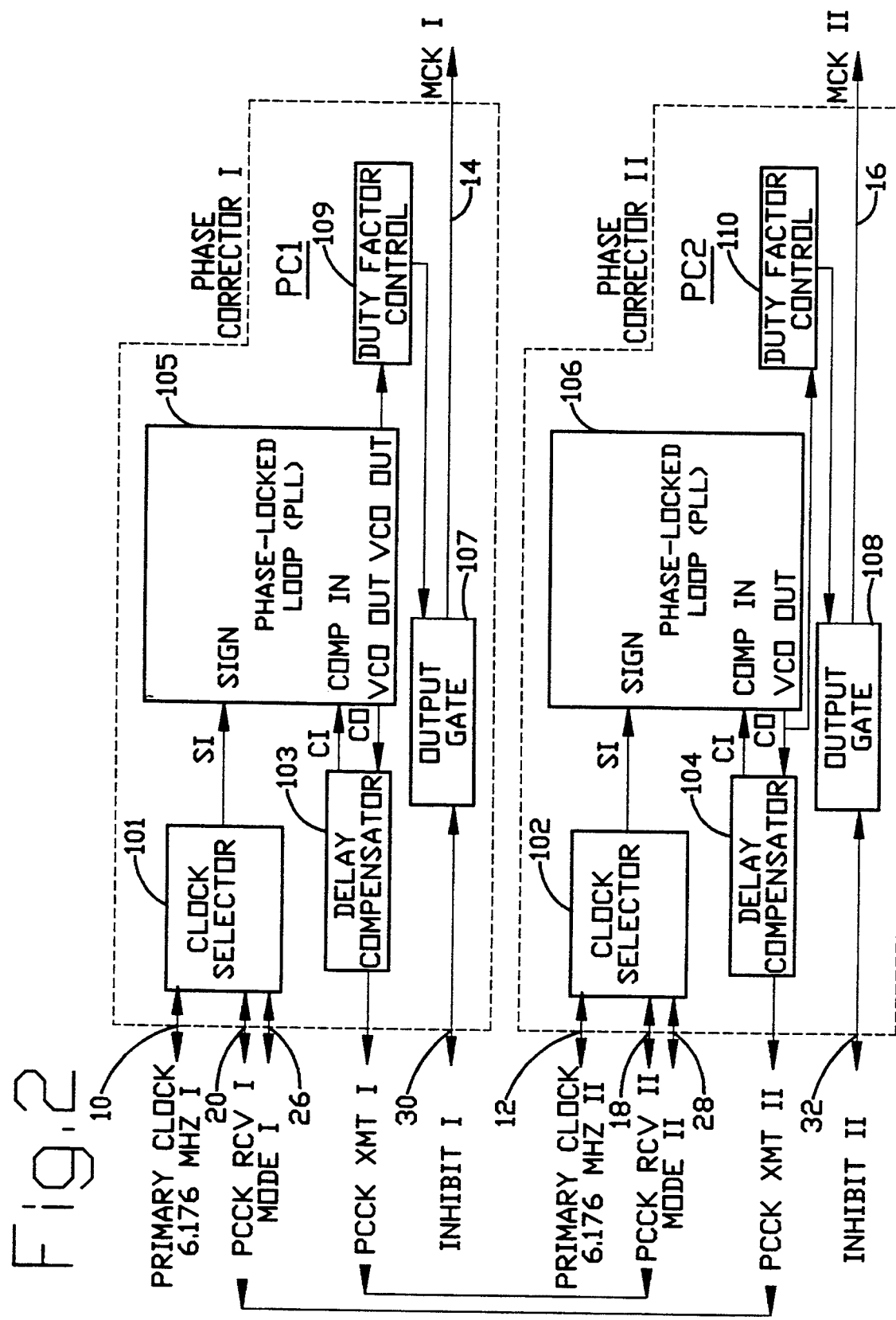
FIG. 2 is a functional block diagram of the preferred embodiment of the phase corrector circuits of the clock control system of FIG. 1.

Referring to FIG. 2, the identical phase corrector circuits PC1 and PC2 have clock selectors 101, 102, delay compensators 103 or 104, phase-locked loops 105 and 106, output gates 107 and 108 and, preferably, duty factor controls 109 or 110. These elements operate together in a manner described in detail with reference to FIG. 3.

Figure 3A:
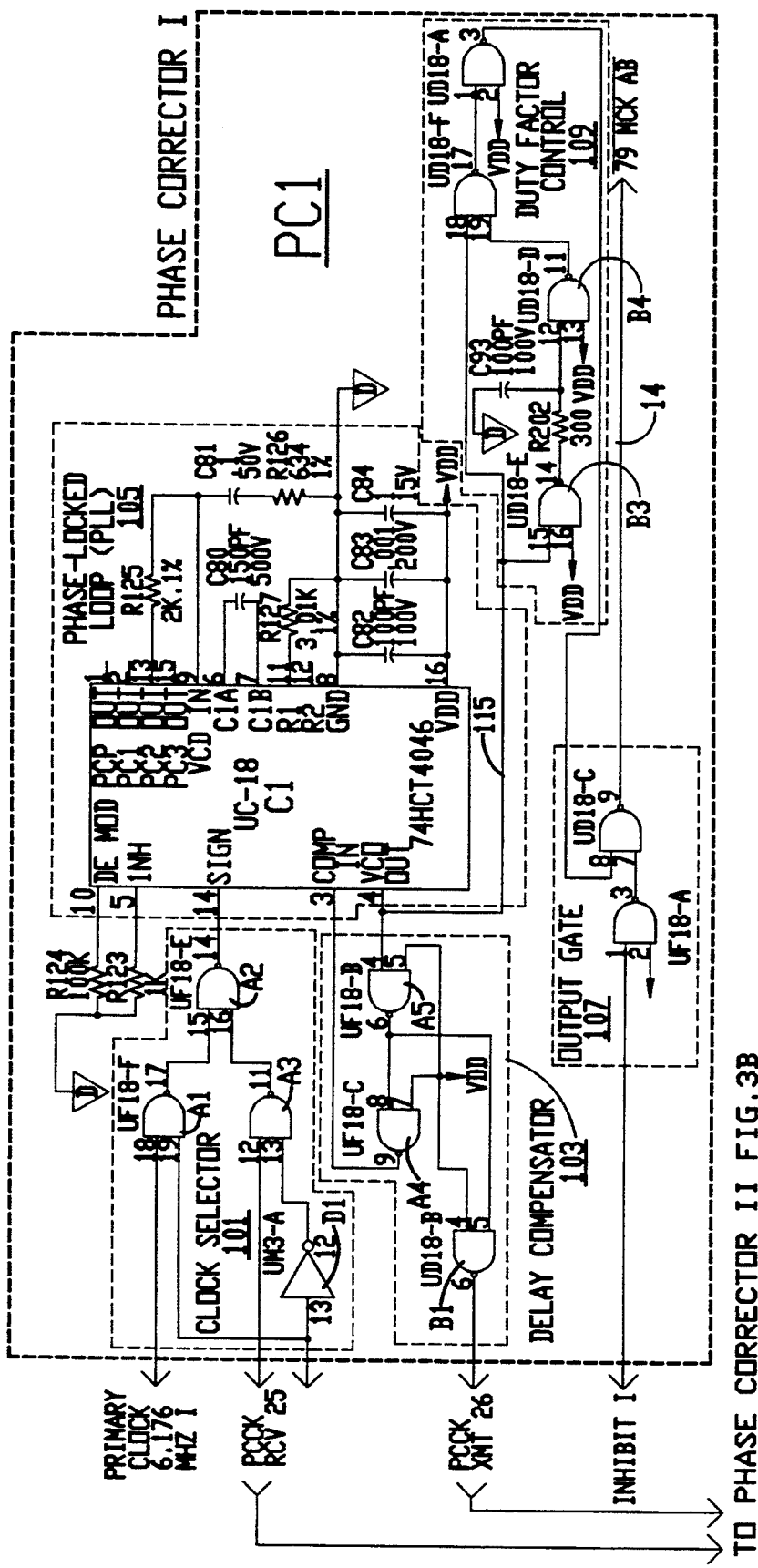
FIG. 3 is a schematic diagram of the functional block diagrams of the pair of phase corrector circuit of FIG. 2.

Referring to FIG. 3, nand driver gates A1-A6 and B1-B2 are preferably 74AS804A devices, which have been specifically selected for their high output drive capability and minimal propagation delay of one to four nanoseconds. Inverter D1 is preferably a 74HCT04 device having a propagation delay of typically seven nanoseconds. The nand driver gates are arranged in the design of the phase corrector in a distinct manner shown in order to achieve the precision phase correction of twenty degrees maximum between the clock outputs 14 and 16. Gates A1-A6 must all be from the same 74AS804A integrated circuit package for optimum results.

The phase-locked loop circuit 105 or 106 preferably consists of a 74HCT4046A device C1 and its associated passive components R123-R127 and C80-C84. The 74HCT4046A C1 is a high speed CMOS phase-locked loop, or PLL, circuit that comprises a linear voltage controlled oscillator VCO and three different phase comparators associated with P1, P2 and P3 with their corresponding outputs. A signal input SI and a comparator input CI are common to each comparator CI. The excellent VCO linearity is achieved by use of linear op-amp techniques. The VCO OUT signal generated by the comparitor CI on output/CO has a guaranteed duty factor of 50%. The 74HCT4046A device features an operating range of up to 18 MHz typically with VCC at +5 v.

Bypassing in a PLL 105 or 106 must be effective at both high and low frequencies. Capacitors C82, C83 and C84 serve as the PLL bypass capacitors and must be installed as close as possible to the PLL between inputs VDD and GND.

The VCO center frequency (fo) on output CO is determined by the component values of resistor R127, between R1 and GND, and capacitor C80, between C1A and C1B. For this application, the values of R127 and C80 are chosen for a VCO center frequency of 6.176 MHZ. Installing a resistor between R2 and GND input enables the VCO to have a frequency offset, if required.

The second phase comparator of the PLL 105 associated with output P2 is also used for this invention. PC2 is a positive edge-triggered phase and frequency detector. When the PLL 105 is using this comparator, the loop is controlled by positive signal transitions, and the duty factors for the SI and CI inputs are not important. The average output voltage from PC2 is fed to the VCO output, a loop filter comprised of resistor R126 and R125 and comparitor C81 and output CO and seen at a demodulation output DMO, is the resultant of the phase difference of the signals at outputs SI and CI. A low level signal at the inhibit input INH enables the CO and DMI inputs, while a high level signal disables the CO and DMI circuits to minimize power consumption, as shown:

$$Vdmi = Vp2 = VDD\ (SI-CI)$$

For PC2, no phase difference exists between SI and CI signals over the full operating range of the VCO. While other circuits could be used, the ability of P2 to maintain zero phase shift between SI and CI during lock and to be insensitive to the duty factors together with the VCO's capability of guaranteeing the CO signal at 50% duty factor at 6.176 MHz, make the 74HCT4046A PLL device the right choice for this invention with regard for minimum complexity and high reliability.

The system dynamics of the PLL 105 are determined by Kv, the DC loop gain constant, and by F(s), the transfer function of the loop filter.

DC Loop Gain = $Kv = KdKo$

Where:

Kd = Phase detector conversion gain evaluated at the appropriate maximum input signal and is expressed in volts/radian.

Ko = VCO conversion gain measured near the VCO center frequency and is expressed in (radians/sec)-/volt.

The Kd and Ko design constants are usually fixed due to the selection of a particular PLL device. In this case, with the 74HC4046A selected, and optioned for PC2 and a center frequency of 6.176 MHZ the Kd and Ko design constant are:

$$Kd = \frac{VCO\ IN\ ma\ at\ 5v\ VDD}{4\pi} = \frac{4V}{4\pi}$$

$$Ko = \frac{(2400\ KHz)\ (2)}{1V}$$

therefore, Kv = KdKo = 4,800,000.

The fundamental loop characteristics such as capture range, loop bandwidth, transient response, and lock time are controlled primarily by the type of low pass loop filter selected. The PLL loop filter is formed by R125, C81 and R126. The loop filter is low pass passive lag-lead filter which allows independant selection of loop bandwidth (Wn), and damping factor (Zeta) for the desired response.

The transfer function, F(s) of the lag-lead filter is:

1 + T2s $$F(s) = \frac{1 + T2S}{1 + (T1 + T2)s}$$

where:
S = F
T1 = (125) (C80)
T2 = (R126) (C80).

The loop bandwidth (Wn) must not be confused with the center frequency (Wo) of the PLL. Wn is the characteristic frequency of the Pll loop at which for a given value of damping (Zeta), the response is a maximum to an exitation at its input with a transient. In other words, Wn dictates the loop or tracking bandwidth of the PLL 105.

The loop bandwidth (Wn) of the PLL (C1) is:

$$\omega n = \left| \frac{Kv}{T1 + T2} \right|^{\frac{1}{2}}$$

The damping factor (Zeta) refers to the ability of the loop to respond to an input frequency step change without excessive overshoot. For Zeta = 1, the PLL system is critically damped. If Zeta is less than unity, the transient response becomes oscillatory. If Zeta is made considerably larger than unity, the dynamic response becomes sluggish.

The damping factor (Zeta) of the PLL (C1) is:

$$Zeta = \frac{\omega n}{2} \left| T2 + \frac{1}{Kv} \right|$$

The lock time (TL) of the PLL is the time required for the transient response to reach and remain within a specified percentage of the steady state value. In some texts, alternate expressions such as settling time (ts) and acquisition time (Ta) are used for lock time.

The lock time (TL) of the PLL 105 is:

$$TL \approx \frac{1}{(n)(Zeta)}$$

The PLL 105 loop parameters for this invention with respect to the actual component values used as shown in FIG. 3 are shown below.
Wn = 134,993 rad/sec
Zeta = 4.293
TL 1.725 microseconds Referring to FIG. 2, phase corrector circuits PC1 and PC2 are set to the active and standby modes respectively with MODE I input set to a logic one and MODE II set to a logic zero. The MCK I and MCK II outputs are enabled with the INHIBIT I and II inputs both set to a logic 1.

With Mode I input at a logic one, the clock selector 101 of the active unit passes the master clock 6.176 MHz signal to the SI, or 111, input of the PLL 105 via nand gates A1 and A2. At this time nand gate A3 of clock selector 101 is inhibited by a logic zero from the output of inverter D1. The PLL 105 then produces a signal at input CI, or 113, via nand gates A4 and A5 of delay compensator 103 and the output CO, or 115, that is at a 50% duty factor and at zero phase shift with respect to the signal at input SI.

Nand gates A4 and A5, of the delay compensator 103 within phase compensator PC1 are installed in series with the output VCO and CI feedback loop for the sole purpose of matching the combined propagation delay of either nand gates A1 and A2 or A3 and A2 of the clock selector circuit 101 in order to nullify the delay and to produce a signal on VO that is essentially in phase with either the master clock MC1 6.176 MHz input signal in the active mode or the PCCK RCV I input signal at input 20 in the standby mode. This concept is based on the assumption that all the nand gates within the same I.C. package are similarly loaded and have the same propagation delay.

The VCO OUT signal on output CO is then routed to the PCCK XMT I output via nand gates A5 and B1 of delay compensator 103. Nand gate B2 of output gate circuit 107 is enabled by a nand gate A6, and as a result, the VCO OUT signal from output CO is inverted and applied to the output bus 14. Consequently, the PCCK XMT I and MCK I clock signals are out of phase by 180 degrees plus from two to eight additional degrees due to the one to four nanosecond propagation delay of nand gate A5 of the delay compensator, assuming that nand gates B1 and B2 propagation delays are identical, since they are from the same I.C. package.

With phase Corrector II in the Standby mode with MODE II input at a logic zero, the clock selector 102 passes the 6.176 MHz clock received from the active unit via PCCK XMT I and PCCK RCV interface leads to the SI input 112 of PLL 106 via nand gates A3 and A2. Nand gate A1 of circuit 102 at this time is inhibited by the MODE II logic zero at input 28. The PLL 106 then produces a signal at COMP IN input 114, via delay compensator 104 nand gates A4 and A5 and the VCO OUT output signal at output VO that is at a 50% duty factor and at zero phase shift with respect to the SIGN signal at input SI. In Phase Corrector II the nand gates A4 and A5 of the delay compensator 104 are installed in series with the VCO OUT output CO and COMP IN input CI feedback loop for the sole purpose of matching the combined propagation in order to nullify the delay and to produce a VCO OUT signal that is essentially in phase with either the master clock signal MC2 in the active mode or the PCCK RCVII input signal at input 18 in the standby mode. As noted this is based on the assumption that all the nand gates within the same I.C. package are similarly loaded and have the same propagation delay.

The VCO OUT signal on output 116 is then routed to the PCCK XMT II output via nand gates A5 and B1. Nand gate B2 of circuit 108 is enabled by nand gate A6 and as result the VCO OUT signal on output VO is inverted and applied to the MCK II output bus 16. Consequently, the PCCK XMT II and MCK II clock signals are out of phase by 180 degrees plus from two to eight additional degrees due to the one to four nanosecond propagation delay of nand gate A5 of circuit 104, again assuming that nand gates B1 of circuit 104 and B2 of circuit 108 propagation delays are identical since they are from the same I.C. package.

Therefore, the phase shift between the MCK I and MCK II 6.176 MHz clock output busses, is determined by the combined propagation delay of nand gate's A5 of circuit 103 and B2 of circuit 108 of two to eight nanoseconds which is equivalent to 4.4 to 17.8 degrees at a 6.176 MHz frequency.

The circuit of FIG. 2 can be modified by breaking the connection 200 to include a duty factor control circuit 109 or 110 in the phase corrector circuits PC1 and PC2, respectively. The duty factor control circuit extends the fixed 50% duty factor clock signal from the VCO OUT signal outputs 115 or 116 to the desired duty factor percentile required by the user system to compensate for the inherent duty factor degradation within the system. However, in providing this optional feature the phase correction precision between the MCK I and MCK II outputs is reduced, causing the phase to increase from twenty degrees to thirty degrees maximum.

The duty factor control circuit 109 or 110 receives a 50% duty factor clock signal from the PLL VCO OUT signal or output 115 or 116 via inputs to nand gates B3 and B5. Nand gates B3, B4 and B6 serve as an inverters. Resistor R202 and capacitor C93 form an integrator to delay the inverted 50% duty factor clock from the output of nand gate B3 before it is applied to nand gate B4 serves as an inverter. Nand gate B5 combines the VCO OUT clock signal on output 115 or 116 and the delayed clock signal to produce a 6.176 MHz clock signal whose duty factor is a function of the delay provided by resistor R202 and capacitor C93 and the switching threshold of nand gate B4. Increasing the delay, causes a direct increase of the duty factor. Nand gate B6 inverts the modified clock signal to the required phase required by the output gate circuit 107 and 108.

While a particular embodiment has been disclosed, it should be appreciated that the invention is not limited to those details, but is defined by the appended claims.

We claim:

1. A redundant clock system for producing a pair of phase synchronized, master, clock output signals in response to a pair of asynchronous master clocks comprising:
   a pair of substantially identical phase corrector circuits for respectively producing on clock outputs thereof the pair of delay compensated, phase synchronized, master, clock output signals, each of said phase corrector circuits having
      a pair of inputs, one of said pair of inputs connected to a respective one of the pair of master clocks to receive an asynchronous master clock signal therefrom and another one of said pair of inputs connected to receive the delay compensated, phase synchronized, clock output signal from the other phase corrector,
   means for producing on the clock output a phase synchronized, master, clock output signal based on a selected one of said asynchronous master clock signal and said delay compensated output signal at said pair of inputs,
   means for selecting one of said master clock signal and said delay compensated output signal producing means, said selecting means introducing a propagation delay between the pair of inputs and the master clock output signal producing means, and
   means connected between the producing means and the output of the phase corrector circuit, for causing the delay compensated, phase synchronized, clock output signal to be provided with an amount of propagation delay to compensate for the propagation delay introduced by the selecting means for producing a phase synchronized, master clock output signal in phase with the selected one of said master clock signal and said delay compensated, phase synchronized, clock output signal; and
   means for controlling both of the phase corrector circuits to selectively produce synchronous master clock output signals in response to different ones of the pair of inputs at each of the phase correctors.

2. The redundant clock system of claim 1 in which each of said phase corrector circuits has an output gate, and said controlling means includes a microprocessor for controlling the output gates to select one of the pair of phase synchronized, master, clock output signals as an active clock signal and to select the other of the pair of phase synchronized, master clock output signals as a standby clock signal.

3. The redundant clock systems of claim 2 in which said controlling means includes means for causing the output gates to output one of the pair of clock output signals as its active clock signal before selecting the other one of the clock output signals as the standby clock signal.

4. The redundant clock system of claim 1 in which the providing means of each of said phase corrector circuits includes a phase locked loop connected to the selecting means.

5. The redundant clock system of claim 4 in which the propagation delay causing means of each of said phase corrector circuits includes a propagation delay compensator connected between the output of the phase corrector circuit and an output of the phase locked look circuit.

6. The redundant clock system of claim 1 in which the selecting means of each of the phase corrector circuits has a clock selection circuit for selectively providing the signal at one of the pair of inputs of the phase corrector circuit to an input of a phase locked loop circuit which is part of the producing means for providing the clock output signal.

7. The redundant clock system of claim 1 in which the propagation delay causing means of each of said phase corrector circuits has a duty factor control circuit connected to the controlling means for generating the clock output signal of the phase corrector circuit with a preselected duty factor which is independent of the duty factor of the other one of the pair of master clocks.

8. The redundant clock system of claim 7 including means for selectively varying said duty factors.

9. The redundant clock system of claim 1 in which said master clocks are frequency locked.

10. In a redundant clock system having a pair of clock signal generators alternately operable in active and standby modes of operation for providing a pair of active and standby clock output signals in phase with each other, the method of reversing the selection of an active device to respond to the clock signal as its active clock signal from one of said pair of clock output signal generators to the other one of said pair of clock signal generators, comprising the steps of:

first changing the selection of the active device for active clock signal from one of said pair of clock output signal generators to the other signal generator; and subsequently reversing mode of operation of the other clock signal generator from standby mode to active mode.

11. The method of claim 10 including the step of subsequently reversing the mode of operation of the one of said pair of clock signal generators from active mode to standby mode.

12. The method of claim 10 including the steps of each of the pair of clock signal generators responding to a master clock individually associated therewith to produce its clock output signal when in the active made and each responding to the clock signal of the other clock signal generator when in the standby mode.

13. The method of claim 10 including the steps of selecting one of said pair of phase corrector circuits as an active phase corrector circuit, selecting the other of said pair of phase corrector circuits as a passive phase corrector, and delay compensating the clock output signal of the active phase corrector, producing with the passive phase corrector the standby clock signal in response to the delay compensated clock output signal.

* * * * *